US005279250A

United States Patent [19]

Palermo, Jr. et al.

[11] Patent Number: 5,279,250

[45] Date of Patent: Jan. 18, 1994

[54] AUTOMATIC FLAG UNFURLER

[76] Inventors: Anthony M. Palermo, Jr., 7399 Tattersall Dr., Chesterland, Ohio 44026; Howard H. Pinkley, 5725 Edgewater Dr., Toledo, Ohio 43611

[21] Appl. No.: 997,505

[22] Filed: Dec. 28, 1992

[51] Int. Cl.[5] .......... G01F 17/00

[52] U.S. Cl. .......... 116/174

[58] Field of Search .......... 116/173, 174; 46/602, 46/604

[56] References Cited

U.S. PATENT DOCUMENTS

| | | | |
|---|---|---|---|
| 632,580 | 9/1899 | Macartney | 116/174 |
| 744,977 | 11/1903 | Nourse | 116/174 |
| 1,646,467 | 10/1927 | Walton | 116/174 |
| 2,711,712 | 6/1955 | Reed, Jr. | 116/174 |
| 2,799,240 | 7/1957 | Andrews | 116/174 |
| 3,183,886 | 5/1965 | Moffitt, Jr. | 116/173 |
| 4,227,406 | 10/1980 | Coffey | 116/265 X |
| 4,582,017 | 4/1986 | Ostermiller | 116/28 R |
| 4,603,652 | 8/1986 | Thibault et al. | 116/174 |
| 4,727,822 | 3/1988 | Wikkerink | 116/174 |
| 4,796,553 | 1/1989 | Cogswell et al. | 116/173 |
| 5,044,301 | 9/1991 | Peters et al. | 116/174 |

*Primary Examiner*—William A. Cuchlinski, Jr.

*Assistant Examiner*—W. Morris Worth

[57] ABSTRACT

An automatic flag unfurling apparatus for use on a flag pole contains a ribbed, lightweight, hollow tube containing strategically located notches in a longitudinal rib extruded integral with the parent plastic tube. Plastic cable ties, inserted into the flags eyelets, engage the notches and retain the flag in its preferable free-flying position. A lower friction reducing washer and retaining collar are firmly positioned on a stationary flag pole to prevent the tube/flag combination from sliding down the pole. The tube/flag combination is free to swivel due to wind forces acting on the tube/flag combination, and regardless of wind direction, freely swivels allowing the flag to remain in an unfurled state.

11 Claims, 4 Drawing Sheets

AUTOMATIC FLAG UNFURLER

BACKGROUND OF INVENTION

The present invention relates to apparatus for automatically unfurling flags that generally tend to wrap around the poles they are mounted on caused by local wind conditions.

Heretofore, flags mounted to poles are typically flown in a variety of orientations. Vertically mounted flag poles generally fly in front of buildings or factories. Flags are also mounted to vertical surfaces such as telephone poles, trees and houses and are flown from poles mounted to the vertical surface at an angle typically 45 degrees. Where the flags are mounted directly to the poles, local wind conditions may cause the flag to wrap around the pole (furl) inhibiting them from flying as intended. In many cases, the flag must be manually unfurled either by removing the flag from the pole or by removing the pole/flag combination from its mounting bracket, unfurling the flag and replacing it in its bracket. Manual unfurling is extremely bothersome and time consuming.

Various flag unfurlers are known in the art. An example as described in U.S. Pat. No. 5,044,301 to Peters et al, utilizes an automatic flag unfurling apparatus comprising a squirrel-cage like assembly. U.S. Pat. No. 4,603,652 to Thibault et al, describes an unfurler comprising a sleeve and various other components to mount the flag to the sleeve and the sleeve/flag assembly to the pole, U.S. Pat. No. 4,727,822 to Wikkerink describes a capped sleeve arrangement placed on the top of the flag pole. U.S. Pat. No. 4,227,406 to Coffey describes an arrangement wherein a shoulder is fixed and fastened to a boat shroud. A tubular mandral which holds a flag sits upon a bearing surface which, in turn, sits on the shoulder. The tubular mandrel is slit along its length to accept and hold the flag in place or by adhesively attaching the flag around the mandrel. Other examples are shown in U.S. Pat. Nos. 744,977 to Nourse; 632,580 to Macartney; 1,646,467 to Walton; and 2,711,712 to Reed, Jr.

All of these devices suffer from the disadvantage in that they are complex and costly in nature, are difficult to install on a flag pole, and require tools for installation. The invention of the present application is designed to overcome these problems and others.

SUMMARY OF THE INVENTION

It is therefore an object of the present invention to provide a low cost automatic flag unfurler that, because of wind conditions, allows a flag to fly in its proper orientation rather than wrapping around its pole.

In accordance with the present invention, and elongate hollow tube, rotatably mountable about a flag pole is provided. An elastic collar means frictionally engages the pole for supporting the tube in position about the flag pole. Additionally, a bearing means is positioned between the collar and the bottom edge of the tube to reduce the rotational friction between the tube and collar. Means are provided to mount the flag to the rotating tube.

In accordance with a more limited aspect of the invention, a rib extending along at least a portion of the longitudinal extent of the tube is provided. The rib interacts with the flag mounting means to prevent substantial movement of the flag mounting means along the longitudinal extent of the tube.

In accordance with another more limited aspect of the present invention, a plurality of notches are provided in the rib wherein the flag mounting means interacts with the rib.

In accordance with yet another more limited aspect of the present invention, the hardness of the rib is substantially less than the tube such that the flag mounting means indents into the rib.

An advantage of the present invention is that it provides a simple, low-cost apparatus for automatically unfurling a flag.

A further advantage of the present invention is that no tools are required to assemble the unfurling apparatus to a flag pole.

A further advantage of the present invention is that the flag and the flag mounting means are maintained in their preselected positons along the longitudinal extent of the unfurling apparatus.

Still further advantages of the present invention will become apparent to those of ordinary skill in the art upon reading and understanding the following detailed description.

DETAILED DESCRIPTION OF THE PREFERRED EMBODIMENT

Figure 1:
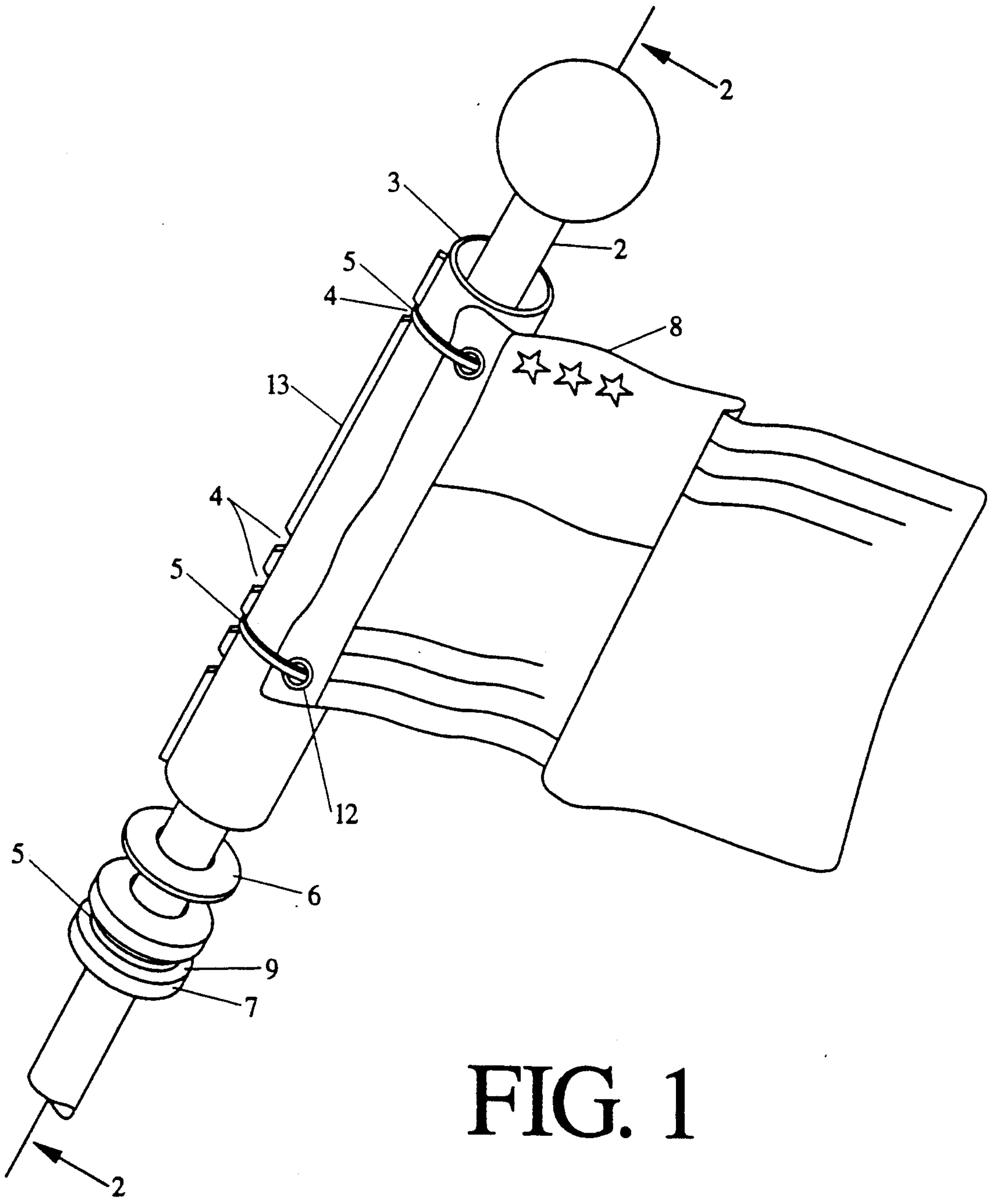
FIG. 1 is an exploded perspective view of the present invention showing the automatic flag unfurling feature.
Figure 2:
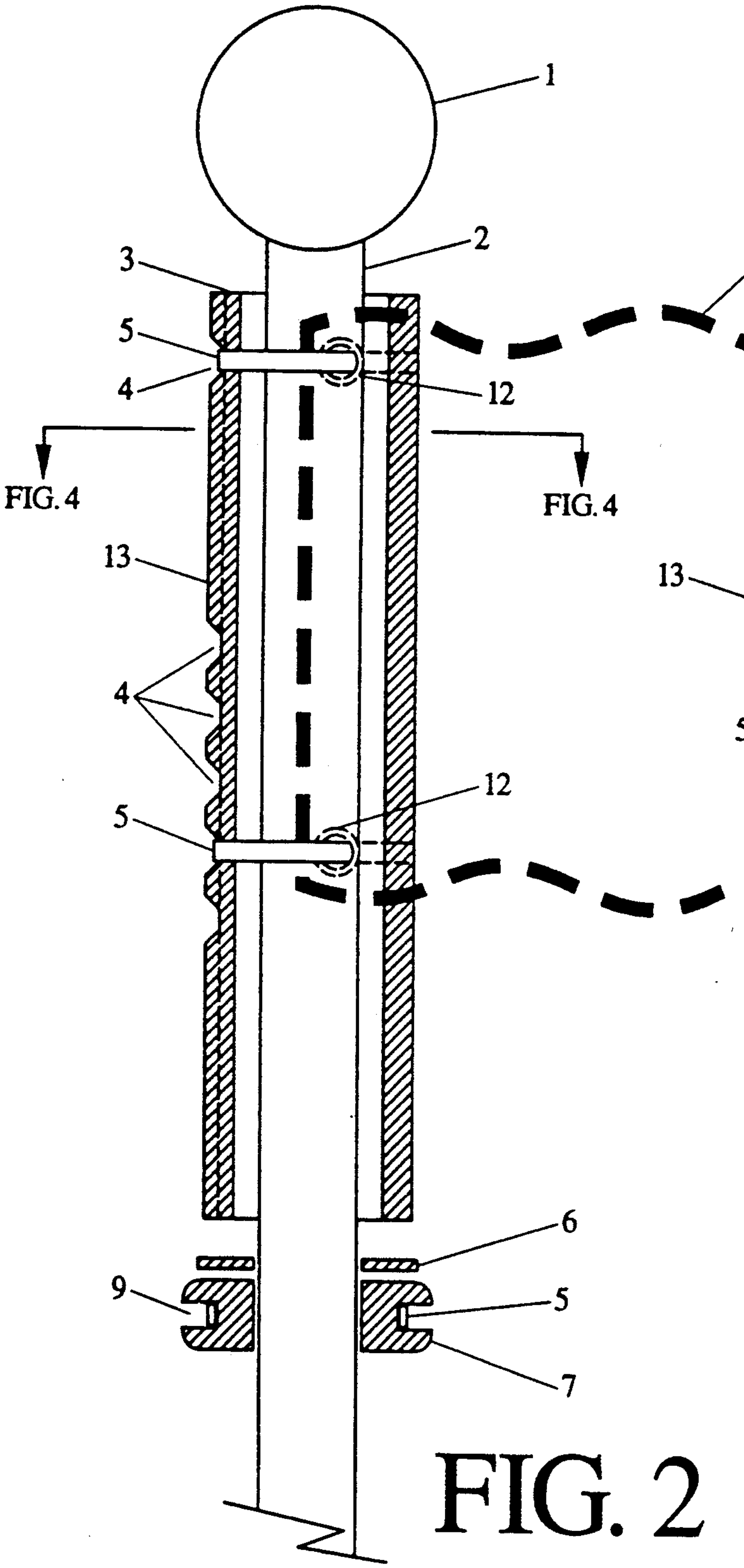
FIG. 2 is a cross sectional view of the automatic flag unfurler according to the present invention taken along lines 2—2 in FIG. 1.
Figure 4:
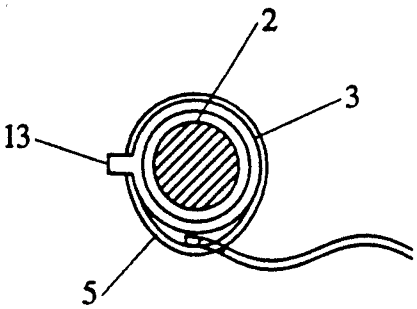
FIG. 4 is a cross sectional view taken along lines 4—4 in FIG. 2.
Figure 3:
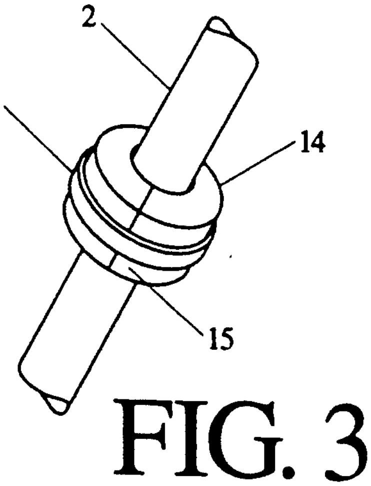
FIG. 3 is an alternate embodiment of portions of the present invention.

With reference to FIGS. 1, 2, and 4, an apparatus for unfurling a flag according to the present invention is shown. An extruded thin walled, preferably plastic tube 3 is provided. The tube 3 has a sufficient inside diameter to fit around a conventional flag pole 2 with sufficient clearance that it rotates freely about the longitudinal axis of the flag pole. A friction reducing washer 6 fits around the flag pole and below the tube 3. An elastic collar 7 having an inside diameter slightly less than the diameter of the flag pole is frictionally engaged around the pole to secure the tube 3 and washer 6 in appropriate position along the length of the pole 2. Whether the pole is mounted in a vertical upright position or at some angle from vertical, gravity acts to engage the tube against, the washer 6 on top of collar 7. A conventional cable tie 5 of appropriate size can be used to more firmly secure collar 7 around pole 2. The collar 7 alternately may be configured with a circumferential slot 9 within which the cable tie 5 may be secured. Referring to FIG. 3, an alternate embodiment of the collar is shown. An elastic collar 14 having an inside diameter slighly less than the diameter of the flag pole 2 is provided. In this embodiment a longitudinal extending slit 15 is provided through the wall thickness of the collar. In this fashion, the collar can be wrapped about the pole 2 at the appropriate location rather than moved along the longitudinal extent of the pole. As before, a cable tie 5 can be used to more firmly secure collar 14 around pole 2.

A standard flag or pennant 8 is mounted to tube 3 by virtue of additional cable ties 5 wrapped around tube 3 and through eyelets 12 on a peripheral edge of flag 8.

From the above description it will be understood that, as a change in wind direction causes the flag to be extended in a direction other than it would normally hang via gravity, the flag 8 may wrap around the pole 2. The weight of the flag coupled with the wind condition however is sufficient to cause the tube 3 to rotate about the flag pole allowing the flag not to become tangled about the pole.

While the above described device is sufficient to permit flag unfurling in accordance with the invention, there is a tendency due to gravity, and perhaps wind forces, for the cable ties 5 which secure flag 8 to the tube 3 to slide along the longitudinal extent of tube 3. In another aspect of the present invention, an integral rib 13 is provided along the longitudinal extent of tube 3. A plurality of strategically cut and spaced notches 4 are located in rib 13. The cable ties 5 used to mount the flag 8 are positioned to engage a first notch at the top of tube 3 and one of a plurality of second notches located along the lower extent of tube 3. In this fashion a single tube can be used to mount a variety of different sized flags. The cable ties 5 mounted within the notches are thus prevented from moving longitudinally along tube 3.

It is to be understood that rib 13 need not extend along the full length of tube 3 but is only required at the top of the tube where the top of the flag will be mounted and for an extent toward the bottom of the tube where the bottom of a variety of sized flags will be mounted. However, where tube 3 is extruded it is preferred that rib 13 be created as part of the extruding process in which case an economic construction would dictate the rib extending along the entire length of the tube.

Figure 5:
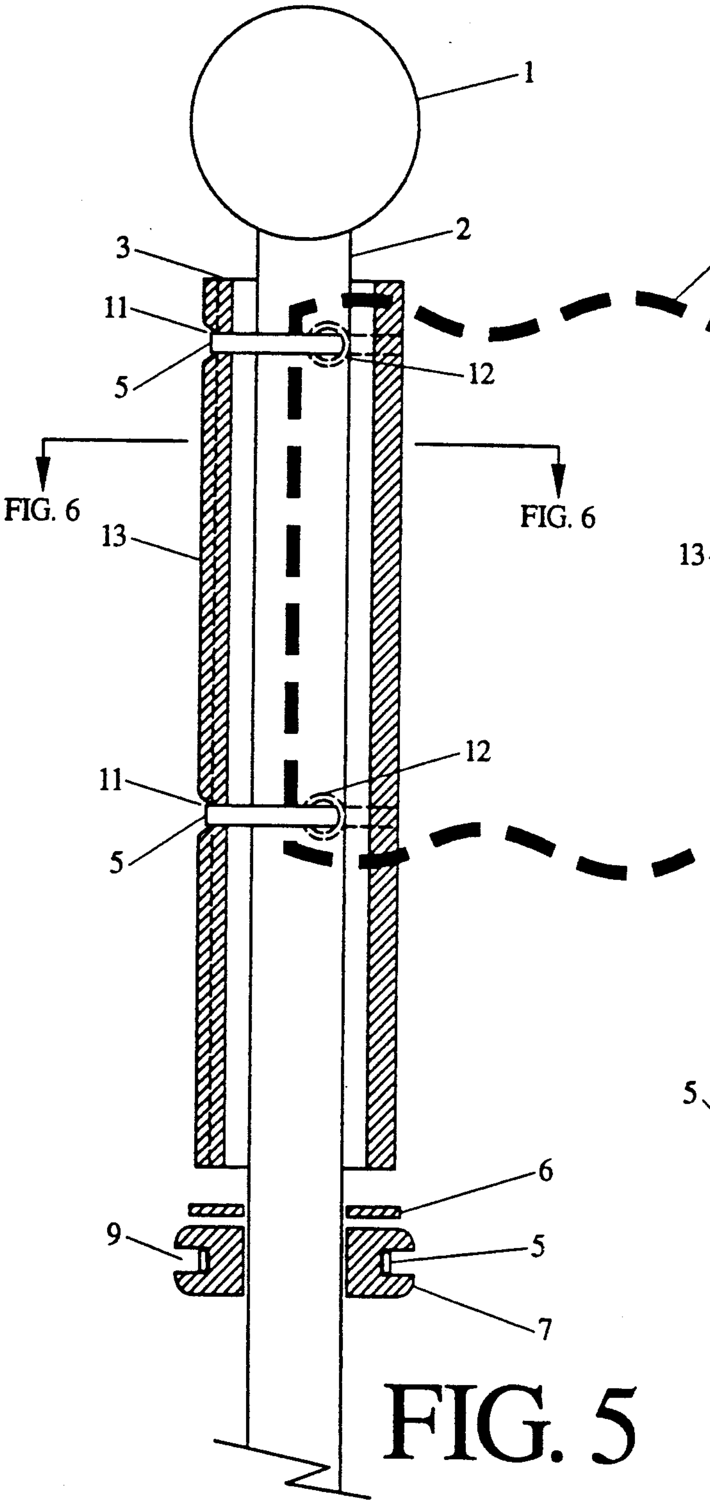
FIG. 5 is a perspective view of an alternate embodiment of the present invention.
Figure 6:
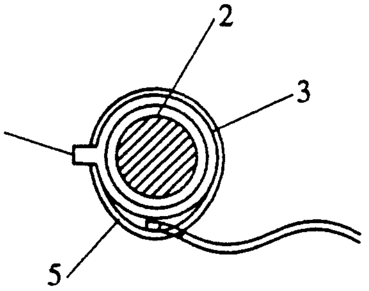
FIG. 6 is a cross sectional view taken along lines 6—6 in FIG. 5.

FIGS. 5 & 6 show an alternate construction of the tube 3 and rib 13 combination. Here, tube 3 is an extruded thin walled plastic longitudinal hollow tube of a given hardness typically Shore Durometer 80, more or less. Extruded integral with tube 3 is rib 13. Rib 13 is of substantially less Durometer (i.e. softer) than tube 3. In this manner, when the cable ties 5 are inserted into the eyelets 12 of flag 8 and tightened around tube 3, the cable ties 5 automatically create their own notches 11 by indenting into the softer plastic rib 13. The same effect of retaining the flag 8 in position is achieved as described above but without using machined notches into the ribs. The flag 8 stays in position, the rib 13 prevents the flag 8 from moving circumferentially around the cable ties 5 by acting as a stop, and most importantly, the pliable rib 13 provides for infinitely variable distance between the flag mounting eyelets 12. Machining notches and polishing operations are eliminated using the co-extrusion process.

Figure 7:
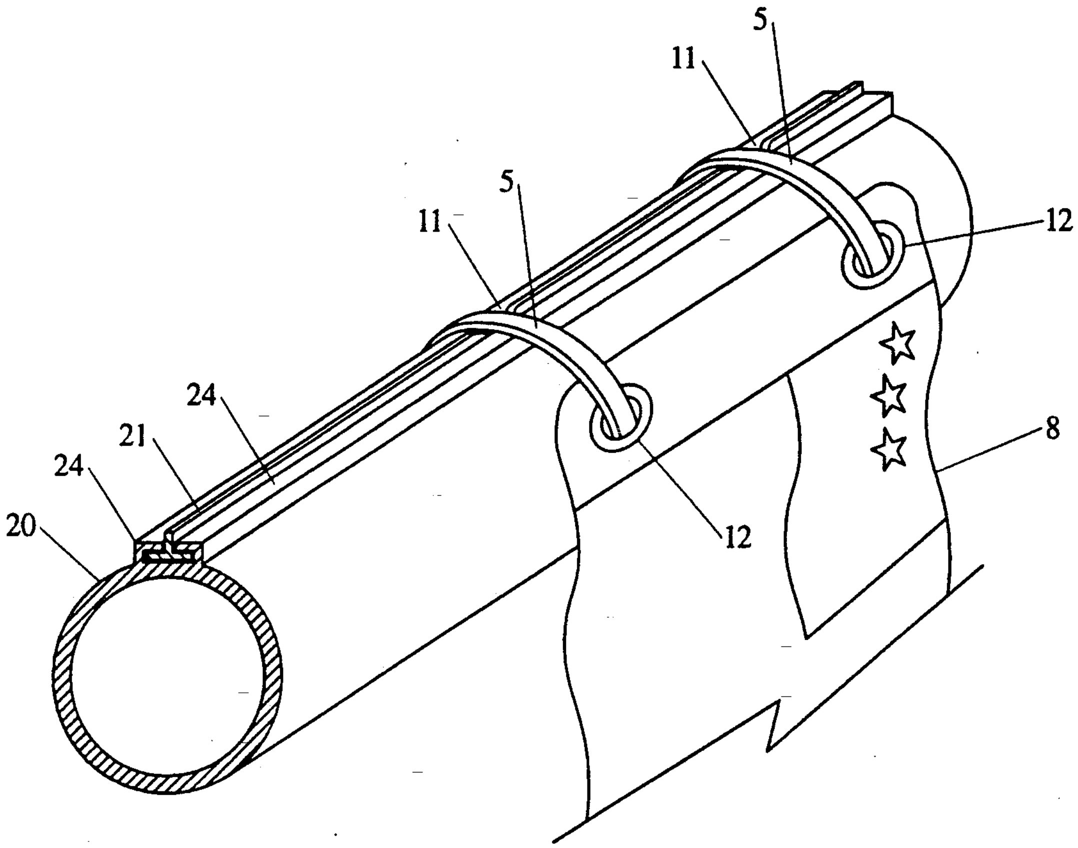
FIG. 7 is a perspective view showing an alternate embodiment of the present invention.

FIG. 7 shows an alternate embodiment to the co-extrusion process. Plastic tube 20, is extruded with longitudinal, finger type retaining grips 24. A separate rib 21, is extruded of a pliable material of substantially less Durometer (softer) than tube 20, and is inserted into retaining grips 24. Thus, when the cable ties 5 are inserted into the eyelets 12 of flag 8 and tightened around tube 20, the cable ties automatically create thier own notches 11 by indenting into the softer rib 21 and the inwardly radial tightening force prevents the rib 21 from sliding out of position as well as retaining flag 8.

The invention has been described with reference to the preferred embodiments. Obviously, modifications and alterations may occur to others upon reading and understanding (the preceding detailed description. It is intended that the invention be construed as including all such modifications and alterations insofar as they come within the scope of the appended claims or their equal.

Having thus described the preferred embodiment, we claim:

1. An apparatus for unfurling a flag comprising:
an elongate hollow tube rotatably mountable about a flag pole, said tube for mounting a flag thereto;
means for mounting the flag to the tube; said tube including means to prevent substantial movement of the flag mounting means along the longitudinal extent of the tube; elastic collar means frictionally engageable to the pole for supporting the tube in position about the flag pole; said collar means being moveable along the longitudinal extent of the pole to position the tube in relation to the pole;
bearing means mounted about the flag pole; and positioned between the collar means and a bottom edge of the tube to reduce the rotational friction between the tube and collar means.

2. The apparatus of claim 1 wherein said means to prevent movement comprises a rib extending along at least a portion of the longitudinal extent of the tube.

3. The apparatus of claim 2 additionally comprising a plurality of notches in said rib wherein said flag mounting means interacts with said rib.

4. The apparatus of claim 2 wherein the hardness of the rib is substantially less than the tube such that the flag mounting means when secured about the tube indents into the rib.

5. The apparatus of claim 1 wherein the mounting means comprise a cable tie engageable with the flag and wrappable about the circumference of the tube.

6. The apparatus of claim 1 additionally comprising a cable tie wrappable about the collar means for exerting inward directed radial force to increase the frictional engagement of the collar means to the pole.

7. The apparatus of claim 6 wherein said collar means additionally comprises a radially extending circumferential slot.

8. The apparatus of claim 6 wherein said collar means additionally comprises a longitudinally extending slit through a wall thickness of said collar means.

9. The apparatus of claim 1 wherein said tube additionally comprises retaining grips extending along at least a portion of the longitudinal extent of said tube, said grips defining a longitudinally extending slot and a separate elongated rib means positionable within said slot and retained by said retaining grips, said rib means when positioned within said slot extending radially outward beyond the retaining grips, for interacting with said flag mounting means to prevent substantial movement of the flag mounting means along the longitudinal extent of the tube.

10. The apparatus of claim 9 additionally comprising a plurality of notches in said rib means wherein said flag mounting means ineracts with said rib means.

11. The apparatus of claim wherein the hardness of the rib means is substantially less than the tube such that the flag mounting means when secured about the tube indents into the rib means.

* * * * *